(12) United States Patent
Taylor et al.

(10) Patent No.: US 8,321,930 B1
(45) Date of Patent: Nov. 27, 2012

(54) KEYBOARD INPUT COORDINATE-BASED LOGIN SYSTEM

(75) Inventors: Paul Wesley Taylor, Lenexa, KS (US);
Joseph Trawicki, Olathe, KS (US);
Todd Jason Reever, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 318 days.

(21) Appl. No.: 12/767,580

(22) Filed: Apr. 26, 2010

(51) Int. Cl.
*G06F 21/00* (2006.01)
(52) U.S. Cl. .............................. 726/17; 726/16; 726/19
(58) Field of Classification Search ............... 726/16–19
See application file for complete search history.

(56) References Cited

U.S. PATENT DOCUMENTS

| | | | |
|---|---|---|---|
| 6,192,478 B1 * | 2/2001 | Elledge | 726/18 |
| 7,185,358 B1 * | 2/2007 | Schreiber et al. | 726/2 |
| 7,574,739 B2 * | 8/2009 | Shirakawa | 726/19 |
| 7,644,868 B2 * | 1/2010 | Hare | 235/494 |
| 7,653,931 B1 * | 1/2010 | Peterson et al. | 726/2 |
| 7,992,202 B2 * | 8/2011 | Won et al. | 726/19 |
| 2006/0206919 A1 * | 9/2006 | Montgomery et al. | 726/2 |
| 2007/0157299 A1 * | 7/2007 | Hare | 726/9 |
| 2009/0320124 A1 * | 12/2009 | Taxier et al. | 726/17 |
| 2012/0005483 A1 * | 1/2012 | Patvarczki et al. | 713/182 |

* cited by examiner

*Primary Examiner* — Ponnoreay Pich

(57) ABSTRACT

Embodiments of the present invention provide systems, methods, and computer-readable media for granting access to a component of a computing device. In particular, embodiments provide methods of presenting a plurality of images on a screen of the computing device. Keyboard-based inputs are received, where the inputs are based on relationships between the images. Based on the accuracy of the inputs received, access is granted to the component of the computing device.

19 Claims, 12 Drawing Sheets

KEYBOARD INPUT COORDINATE-BASED LOGIN SYSTEM

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

Many computing systems present display screens, such as screen savers, that are meant to be aesthetically pleasing. However, display screens also provide an opportunity for adding an extra layer of security to a computing device beyond the use of a password locking feature. Screen savers used to cover login screens may be used to subtly authenticate that a user should be granted access to the computing device. In particular, it would be beneficial to provide an extra layer of security before granting access to a component of a computing device. Access to the component may be granted upon receiving an accurate authentication code that is based on relationships between images presented on a screen of the computing device.

In a first aspect, a set of computer-usable instructions provide a method of granting access to a component of a computing device, which includes a screen and a keyboard, in response to receiving input based on a current screen presentation on the computing device. The method comprises presenting a plurality of images on the screen, which has been logically divided into a plurality of regions. Each region is mapped to at least one key of the keyboard. Input is received by way of the keyboard. The input is based on a current screen presentation comprising images of the plurality of images in regions of the screen. Accordingly, access is granted to the component of the computing device when the input provided is accurate based on the current screen presentation.

In a second aspect, a set of computer-usable instructions provide a method of granting access to a component of a computing device, which includes a screen and a keyboard, in response to receiving input based on a current screen presentation on the computing device. The method comprises presenting a plurality of images on the screen, which has been logically divided into a plurality of regions referenced by graphical axes, wherein each graphical axis is mapped to at least one key of the keyboard. The method further comprises receiving input by way of the keyboard, wherein the input is based on spatial relationships between images of the plurality of images as presented in a current screen configuration. Further, access is granted to the component of the computing device when the input provided is accurate based on the current screen presentation.

In a third aspect, a set of computer-usable instructions provide a method of granting access to a component of a secured device, which includes a screen and a keyboard, in response to receiving input based on a current screen presentation on the secured device. The method comprises presenting a plurality of images on the screen. In particular, the screen is logically divided into a plurality of regions referenced by graphical axes. Each graphical axis of the graphical axes has at least one graphical axis indicator. Further, each graphical axis of the graphical axes is mapped to at least one key of the keyboard. The method further comprises receiving input by way of the keyboard. The input is based on graphical coordinates of locations of images of the plurality of images as presented on the a current screen presentation. Accordingly, access is granted to the component of the secured device when the input provided is accurate based on the current screen presentation.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
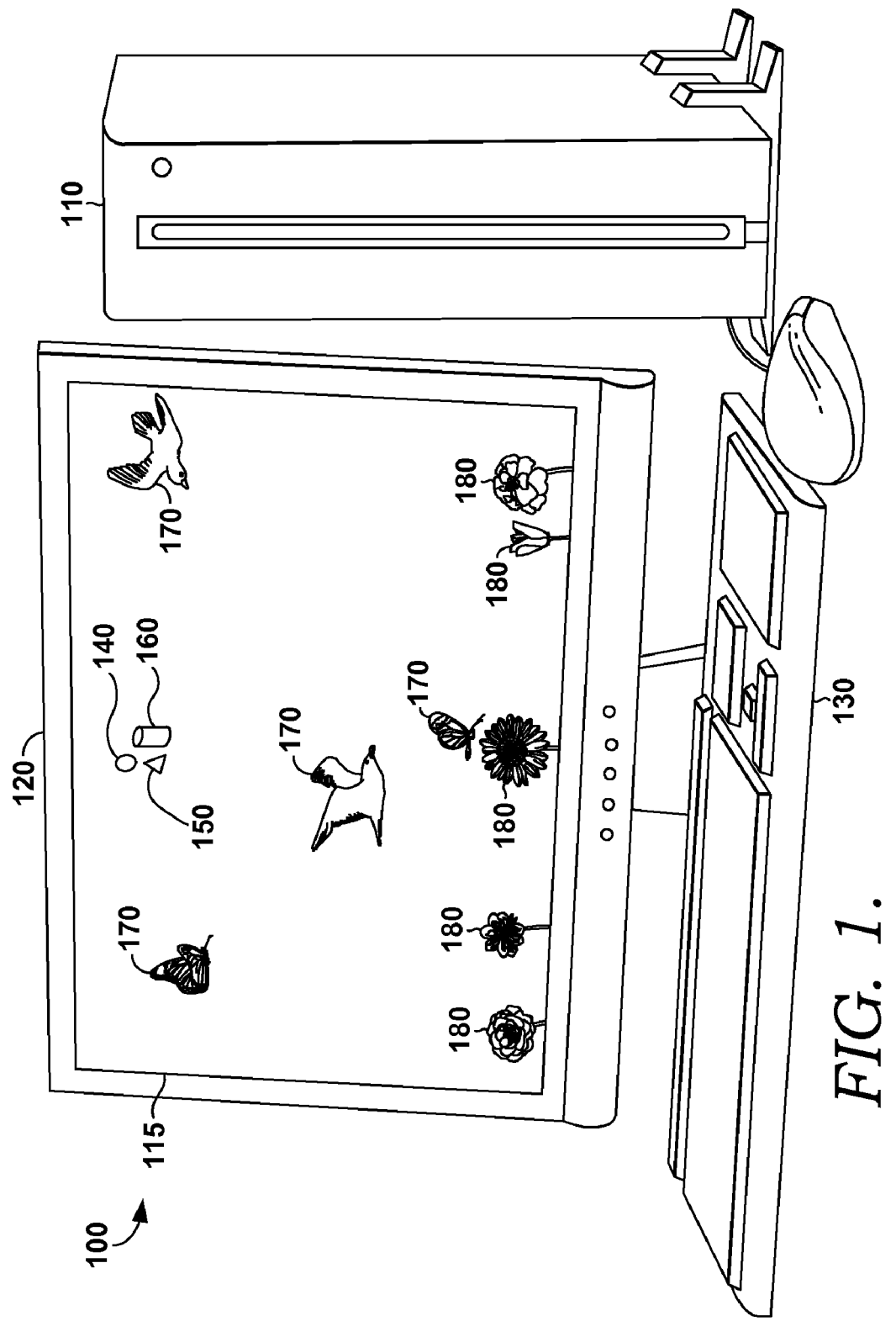
FIG. 1 depicts an illustrative system, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for granting access to a component of a computing device in response to receiving valid inputs based on a presentation of images. In particular, methods are provided for granting access to a component of a computing device based on keyboard-based inputs of an authentication code. The veracity of the inputs is based on the relationship between images presented on a screen of the computing device.

As discussed above, access to a component of a computing device may be dependent upon receiving accurate inputs, such as an accurate authorization code. In particular, the authorization code may be based on relationships between images presented on a screen of the computing device. Users may indicate relationships between presented images by inputting image references using a keyboard and/or touch pad. For example, a presentation of static images of an apple, pear, and orange on a screen of a computing device may be referenced using the keys "A," "P," and "O" of a keyboard, respectively. Further, an authorization code associated with the presentation of the apple, pear, and orange may reference the position of the apple in relation to the position of the pear and the position of the orange in relation to the position of the apple. As such, the correct authorization code for the above example is "A-P-O-A."

In a further example, the images of the apple, pear, and orange may be dynamic. For instance, the apple, pear, and orange may each move between a first position and a second position. Accordingly, a presentation of dynamic images of an apple, pear, and orange on a screen of a computing device may be referenced using the key combinations "A1," "A2," "P1," "P2," "O1," and "O2" to indicate an apple at a first and second position; a pear at a first and second position; and an orange at a first and second position, respectively. Further, as discussed above, an authorization code associated with the presentation of the apple, pear, and orange may reference the position of the apple in relation to the position of the pear and the position of the orange in relation to the position of the apple. As such, if a presentation of images for a given period of time shows an apple at a first position, a pear at a second position, and an orange at a first position, respectively, the correct authorization code is "A1-P2-O1-A1."

In accordance with the first two examples, a user who is using an authorization code to access a component of a computing system may do so without signaling to other users that the extra layer of security is in place. This is because, under the two examples above, the presentation of images may look like a screen saver or a desktop background. As such, if an unauthorized user attempts to access the component of the computing device, say by accessing a login screen using a standard command such as "Ctrl-Alt-Delete," the unauthorized user may be presented with a false login screen, e.g. a login screen that defaults to say the login information was incorrect, even if the unauthorized user managed to determine/input the password of the authorized user. In this way, the authorized user may be protected from an unauthorized user gaining access to his computer, while the unauthorized user may be left with the impression that he just had the incorrect password. By keeping an unauthorized user unaware of the extra layer of protection, the authorized user is further protected from the unauthorized user gaining unauthorized access to the authorized user's computing device.

While the two examples above use keyboard references based on each image, further embodiments of the present invention may reference the location of an image. Images may be set against a grid pattern and the references of the grid pattern may be used to identify images presented on a screen of a computing device. For example, a grid with axes <A,B,C> and <1,2,3> may be used to identify images that are placed on the grid using <letter, number> coordinates. As such, an apple, pear, and orange may be referenced with the coordinates, <B,2>; <C,3>; and <A,1,>, respectively. As discussed above, an authorization code associated with the presentation of the apple, pear, and orange may reference the position of the apple in relation to the position of the pear and the position of the orange in relation to the position of the apple. Further, in accordance with the example above, the correct authorization code using <letter, number> coordinates is "B-2-C-3-A-1-B-2."

Additionally, the coordinates used to identify positions of images on a grid may be different than coordinates presented on the grid itself. For instance, if a grid is presented with axes identified as <A,B,C> and <1,2,3>, the correct coordinates for inputting an authorization code may be <S,D,F> and <2,5,7>, respectively. As such, an apple, pear, and orange referenced with the coordinates <B,2>; <C,3>; and <A,1,>, respectively, may have authorization code coordinate inputs of <D,5>; <F,7>; and <S,2>, respectively. Further, in accordance with the example above, the correct authorization code using encrypted <letter, number> coordinates is "D-5-F-7-S-2-D-5." As such, an additional layer of security may be added to grant access to a component of a computing device.

While the use of grids, particularly the use of grids with encrypted axes, increases the potential number of variations of an authorization code, the presence of the grid may signal to an unauthorized user that there is an additional layer of security protecting access to a component of a computing device. As such, the axes of a grid may be hidden while the grid itself may be placed in an aesthetic design to more closely mimic an innocuous screen saver of the computing device. In this way, an authorized user may set and memorize the grid axes of the grid and input an authorization code based on the presented images, accordingly.

In embodiments, a company may have a standard screen saver with a hidden axis grid pattern. Each user may set the grid axes, such as setting grid coordinates based on children's names or a security password. For instance, a first employee may set a grid pattern to <A,D,E> and <5,17,22> based on names of his children (such as Alison, David, and Eve) and birthdays of his children (such as May 5, March 17, and October 22). Further, each user may set the relational basis of the authorization code, such as basing the authorization code on the relationship of the apple to the pear and the relationship of the orange to the apple, as used in examples above. As such, multiple users of a company may have an apple, pear, and orange presented identically on a screen of a computing device, but the authentication codes for each user may differ based at least on 1) the definition of axes for a grid, and 2) the relationships between the images that are used as a bases for the determination of an authentication code for each user.

Additionally, the relationship between images that serves as the basis of an authorization code may be logically dependent. For instance, when a lime is presented on the screen of the computing device in addition to images of an apple, pear, and orange, the authorization code may be based on the relationship of the apple to the lime and the relationship of the pear to the orange. However, if the lime is not presented, the authorization code may be based on the relationship of the apple to the pear and the relationship of the orange to the apple, as discussed above. As such, the veracity of an authorization code may not only depend on the placement of images presented on a screen of a computing device, but may also depend on the content of the images presented on the screen of the computing device.

An additional layer of security may be added to embodiments of the present invention by altering configurations of grid areas associated with inputting an authentication code. For example, a screen saver may have two sets of images, each set containing an apple, pear, and orange as discussed above. Further, each set may be restricted to an upper half and lower half of the screen saver, respectively. Given a configuration indicator, such as a change in background color, an authorized user may use the first set of images or the second set of images as a basis for inputting an authorization code. For example, if a background of the screen saver is green, the upper set of images may be used as a basis for inputting an authorization code. Alternatively, if the background of the screen saver is red, the lower set of images may be used as a basis for inputting an authorization code.

Turning now to FIG. 1, an illustrative system is provided in accordance with an embodiment of the present invention and referenced by the numeral 100. System 100 includes a computing device 110. For brevity or as a shorthand form, this description might refer to a "device" instead of a "computing device." This shorthand does not mean to imply a distinction between the different terms. In addition, a computing device may refer to a number of different devices such as a mobile device, a cell phone, a video player, a handheld communications device, a computer, a walky-talky, a PDA, a workstation, any combination of these devices, or any other computing device, including a device that is capable of web accessibility. This description does not intend to convey bright-line distinctions between the different types of computing devices.

In addition to device 110, system 100 may further include user interface 115, screen 120, keyboard 130, application 140, memory 150, data structure 160, dynamic display images 170, and static display images 180. Generally, user interface 115 and keyboard 130 provide an input/output (I/O) interface that a user may engage to interact with device 110. For example, user interface 115 may include a touch screen that a user may scratch or touch to interact with device 110. This interaction may include providing settings to govern the receipt of input into user interface 115 and/or keyboard 130 in accordance with embodiments of the present invention.

Device 110 can be any device with a keyboard and/or a touch pad input. In some embodiments, device 110 may be capable of web accessibility, such as to facilitate access to online resources. In some embodiments, device 110 is a mobile device that utilizes a wireless telecommunications network to facilitate communication and/or web accessibility. Makers of illustrative computing devices include, for example, Research in Motion®, Creative Technologies Corp., Samsung®, Nokia®, LG®, Motorola®, Apple® Computer, and the like. A mobile device can include, for example, a display(s), a power source(s) (e.g., a battery), a data store(s), a speaker(s), memory, a buffer(s), and the like.

Device 110 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for granting access to a component of a computing device, such as device 110. For example, application 140 may use computer software to present a plurality of images on a screen of device 110, receive input based on the presentation of images, and assess the accuracy of the input based on the plurality of images presented. Further, application 140 may present a screen in response to assessing the accuracy of input received at device 110.

Memory 150 may include a data structure 160 that stores and facilitates the operation of application 140. For example, memory 150 may store data relating to configurations of a plurality of images. In particular, memory 150 may store location-based attributes of coordinates of a plurality of users. In addition, memory 150 may store firmware and other various software modules and components that might be present in device 110. These modules and components may be used in some embodiments of the present invention to grant access to a component of device 110 in response to receiving an input based on a presentation of a plurality of images. Other examples of illustrative software include things such as the operating system of a phone, third-party applications, ring tones, location-based services, contact information, and the like. In sum, FIG. 1 is not meant to indicate all, or even major, systems or components of device 110. An overview of device 110 is presented and certain components are listed so as to be able to refer to them throughout this disclosure.

Figure 2:
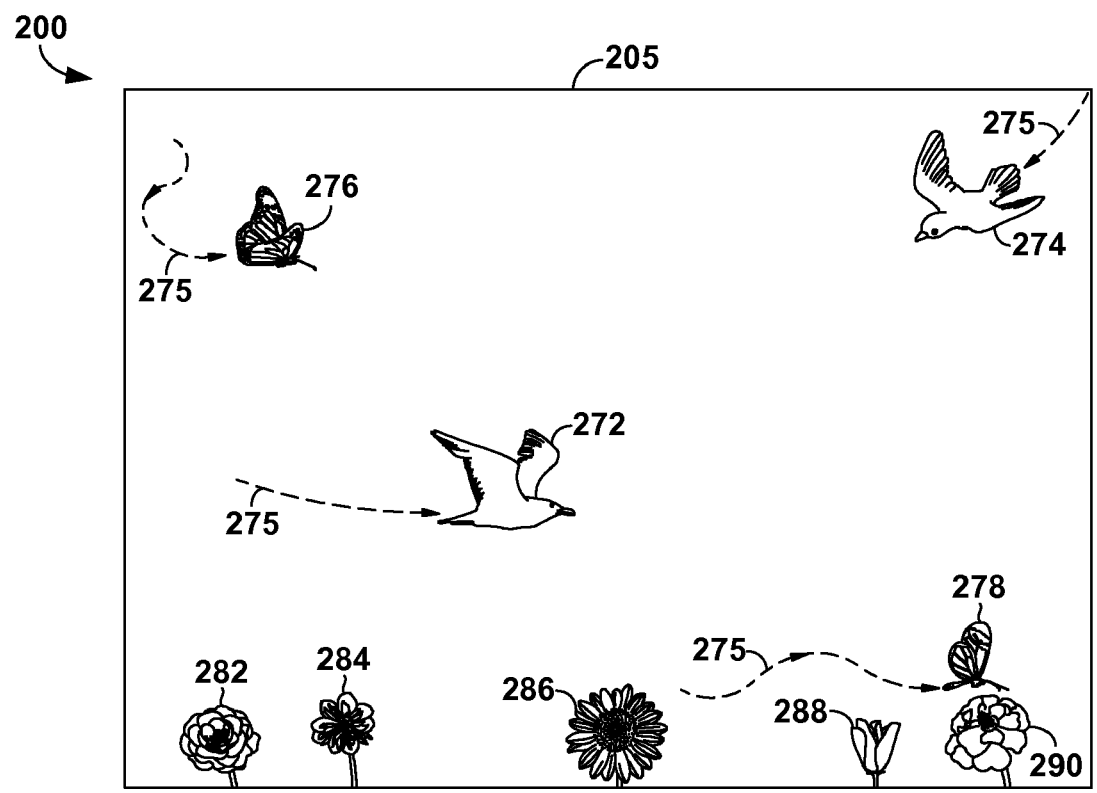
FIG. 2 illustrates a screen saver at a first current screen presentation, in accordance with an embodiment of the present invention.

FIG. 2 illustrates a screen saver 200 at a first current screen presentation 205, in accordance with an embodiment of the present invention. In particular, screen saver 200 includes dynamic display images 272, 274, 276, and 278; dynamic display image paths 275; and static display images 282, 284, 286, 288, and 290. Each of the dynamic display images and static display images may be mapped to at least one key of a keyboard. Accordingly, in embodiments of the present invention, access to a component of a computing device may be dependent upon entering relational information about two or more images displayed on screen saver 200. For example, birds 272 and 274 may be mapped to keys "A" and "B," respectively, while butterflies 276 and 278 may be mapped to keys "C" and "D," respectively. Further, flowers rose 282, flower 284, daisy 286, tulip 288, and hydrangea 290 may be mapped to keys "E," "F," "G," "H," and "I," respectively. As such, one authorization code associated with screen saver 200 may include reference to a bird in relation to a daisy and a butterfly in relation to a rose. Accordingly, using the mappings listed above, four inputs are accurate based on a first current screen presentation 205. In particular, inputs "A-G-C-E," "A-G-D-E," "B-G-C-E," and "B-G-D-E" are accurate inputs that may be entered as authorization codes. As such, requirements of an authorization code may be met by more than one set of inputs.

Figure 3:
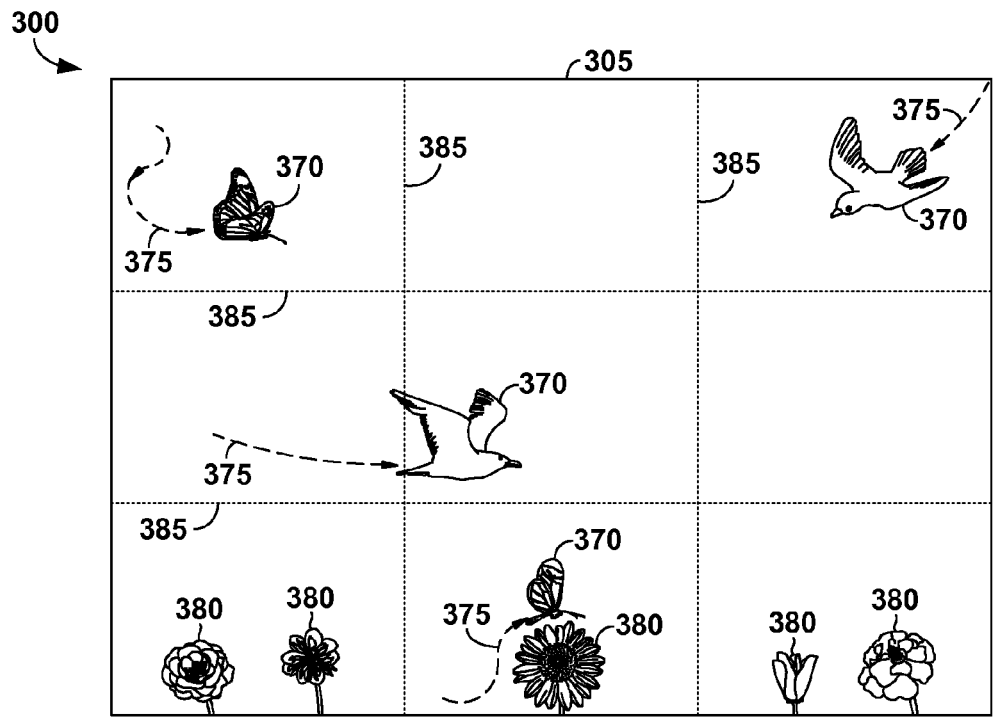
FIG. 3 illustrates a screen saver at a first current screen presentation, the screen saver including visible graphical axes, in accordance with an embodiment of the present invention.

As seen in FIG. 2, embodiments of the present invention may include screen savers without grid lines and graphical axes. In further embodiments, such as seen in FIG. 3, screen savers may be provided that possess grid lines and graphical axes. As such, FIG. 3 illustrates a screen saver 300 at a first current screen presentation 305, the screen saver 300 including visible graphical axes 385, in accordance with an embodiment of the present invention. In particular, screen saver 300 includes dynamic display images 370, dynamic display image paths 375, static display images 380, and graphical axes 385. The use of grid lines and graphical axes 385 may help a user to better perceive the spatial relationships between images, such as dynamic display images 370 and static display images 380.

Figure 4:
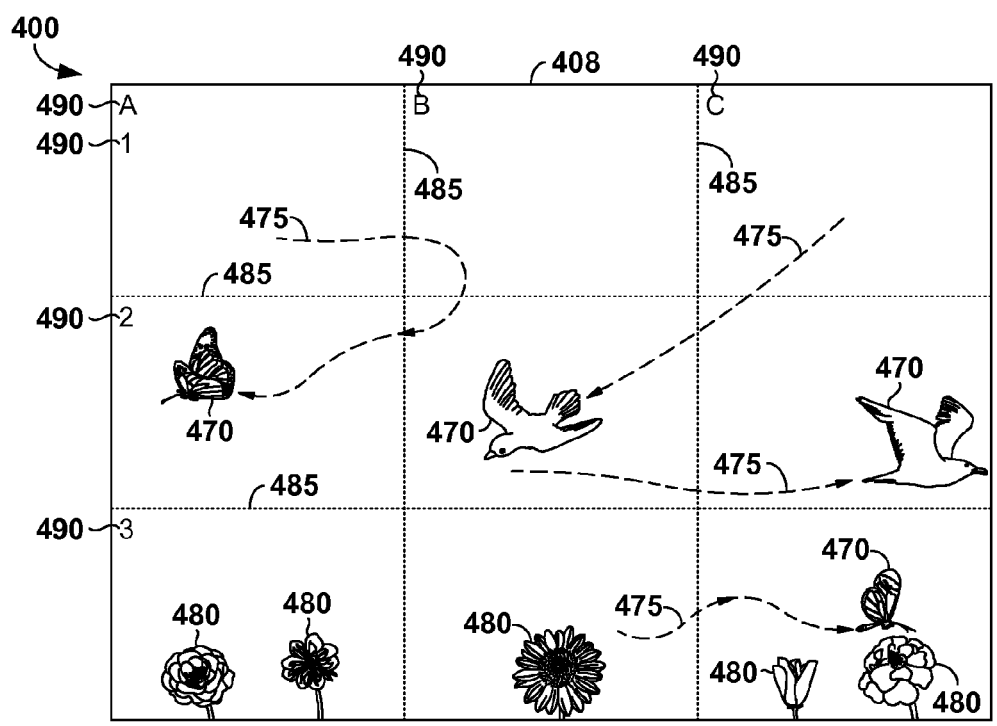
FIG. 4 illustrates a screen saver at a second current screen presentation, the screen saver including visible graphical axes and graphical axis identifiers, in accordance with an embodiment of the present invention.

In addition to embodiments that include grids and graphical axes, additional embodiments of the present invention may also include graphical axis identifiers. As such, FIG. 4 illustrates a screen saver 400 at a second current screen presentation 408, the screen saver 400 including visible graphical axes 485 and graphical axis identifiers 490, in accordance with an embodiment of the present invention. Additionally, screen saver 400 includes dynamic display images 470, dynamic display image paths 475, and static display images 480. In the same way that grid lines and graphical axes 485 may help a user to better perceive the spatial relationships between images, the use of graphical axis identifiers 490 may help a user to better reference the spatial relationships between images, such as dynamic display images 470 and static display images 480.

Figure 5:
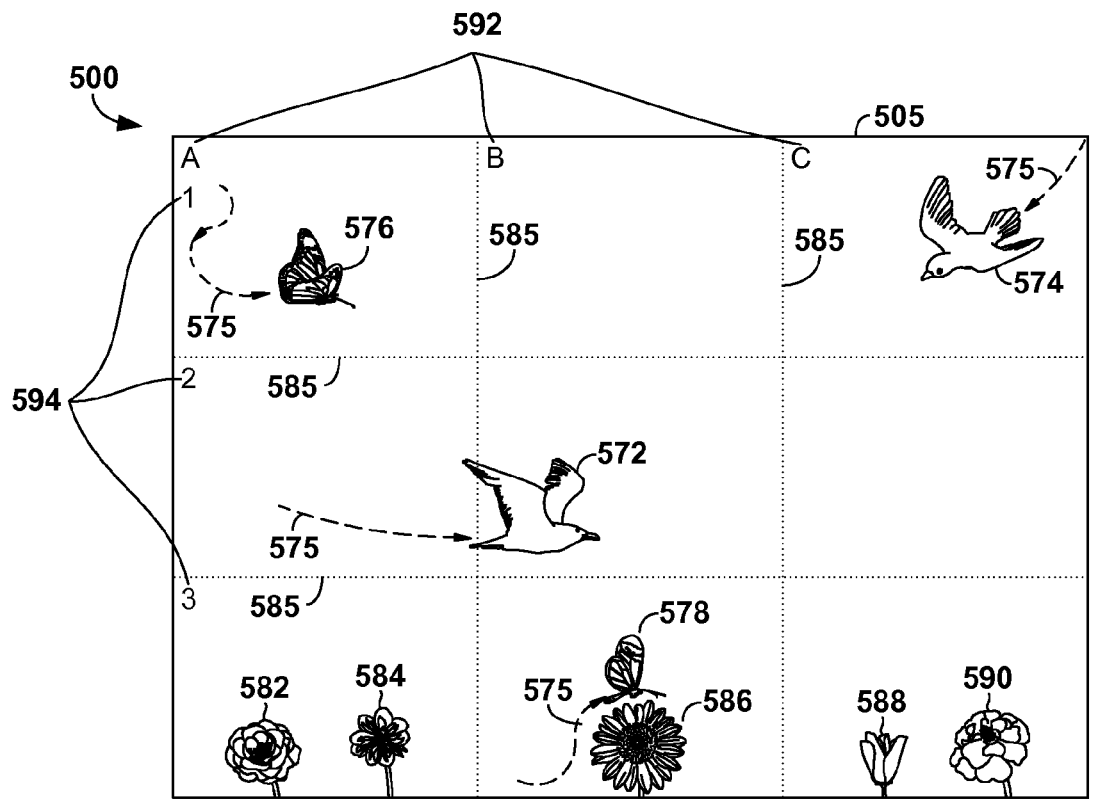
FIG. 5 illustrates a screen saver at a first current screen presentation, the screen saver including visible graphical axes and graphical axis identifiers, in accordance with an embodiment of the present invention.

FIG. 5 further comprises graphical identifiers used to reference individual squares of a grid in accordance with an exemplary embodiment of the present invention. As such, FIG. 5 illustrates a screen saver 500 at a first current screen presentation 505, the screen saver 500 including visible graphical axes 585 and graphical axis identifiers 592 and 594, in accordance with an embodiment of the present invention. Additionally, FIG. 5 includes dynamic display images 572, 574, 576, and 578; dynamic display image paths 575; and static display images 582, 584, 586, 588, and 590. Each of the dynamic display images and static display images may be mapped to at least one set of graphical coordinates.

Accordingly, in embodiments of the present invention, access to a component of a computing device may be dependent upon entering coordinate-based relational information relating two or more images displayed on screen saver 500. For example, birds 572 and 574 may be mapped to coordinates "B2" and "C1," respectively, while butterflies 576 and 578 may be mapped to keys "A1" and "B3," respectively. Further, flowers rose 582, flower 584, daisy 586, tulip 588, and hydrangea 590 may be mapped to keys "A3," "A3," "B3," "C3," and "C3," respectively. As such, one authorization code associated with screen saver 500 may include reference to a first relationship of a bird, such as bird 572, in relation to a daisy and a second relationship of a butterfly, such as butterfly 578, in relation to a rose. Accordingly, using the mappings listed above, one set of inputs is accurate based on a first current screen presentation 505.

Figure 6:
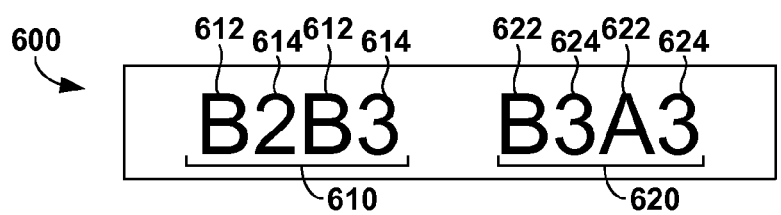
FIG. 6 illustrates inputs associated with FIG. 5, in accordance with an embodiment of the present invention.

FIG. 6 illustrates inputs 600 associated with FIG. 5, in accordance with an embodiment of the present invention. In particular, inputs 600 include "B2-B3" to indicate first relationship 610. In particular, inputs 600 include column identifiers 612 and row identifiers 614. Additionally, inputs 600 also include "B3-A3" to indicate second relationship 620. In particular, inputs 600 include column identifiers 622 and row identifiers 624.

Figure 7:
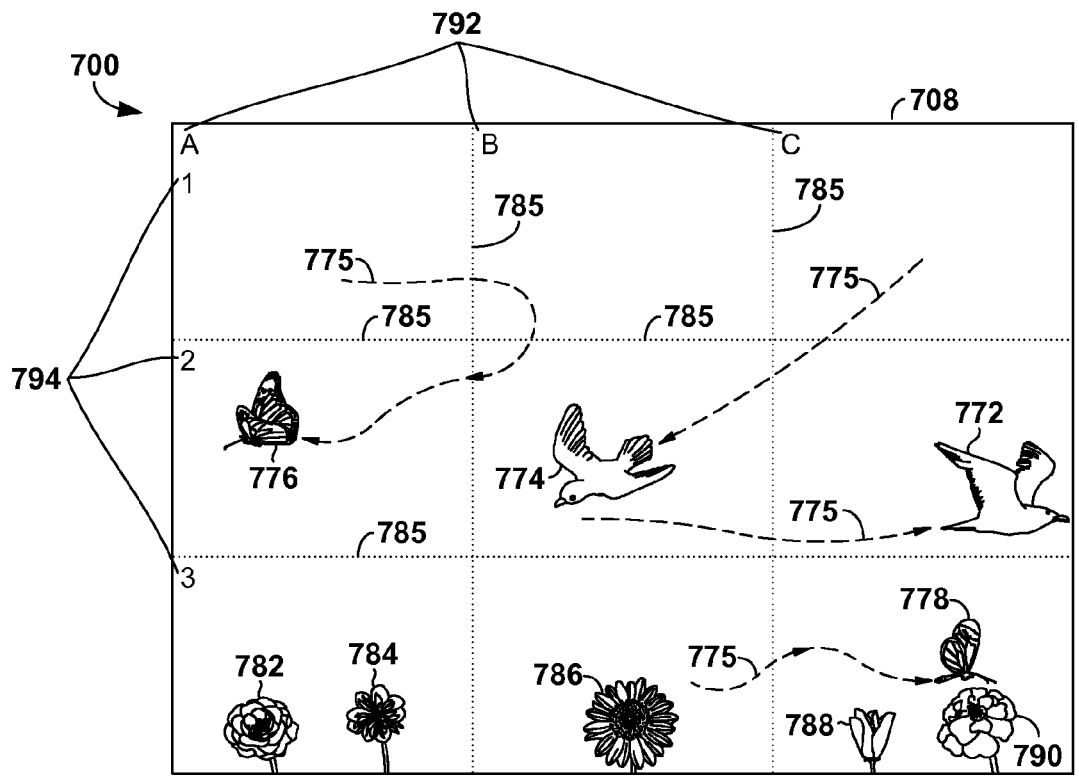
FIG. 7 illustrates a screen saver at a second current screen presentation, the screen saver including visible graphical axes and graphical axis identifiers, in accordance with an embodiment of the present invention.

FIG. 7 illustrates a screen saver 700 at a second current screen presentation 708, the screen saver 700 including visible graphical axes 785 and graphical axis identifiers 792 and 794, in accordance with an embodiment of the present invention. Additionally, FIG. 7 includes dynamic display images 772, 774, 776, and 778; dynamic display image paths 775; and static display images 782, 784, 786, 788, and 790. Each of the dynamic display images and static display images may be mapped to at least one set of graphical coordinates. Accordingly, in embodiments of the present invention, access to a component of a computing device may be dependent upon entering coordinate-based relational information relating two or more images displayed on screen saver 700. For example, birds 772 and 774 may be mapped to coordinates "C2" and "B2," respectively, while butterflies 776 and 778 may be mapped to keys "A2" and "C3," respectively. Further, flowers rose 782, flower 784, daisy 786, tulip 788, and hydrangea 790 may be mapped to keys "A3," "A3," "B3," "C3," and "C3," respectively. As such, one authorization code associated with screen saver 700 may include reference to a first relationship of a bird, such as bird 772, in relation to a daisy and a second relationship of a butterfly, such as butterfly 778, in relation to a rose. Accordingly, using the mappings listed above, one set of inputs is accurate based on a second current screen presentation 708.

Figure 8:
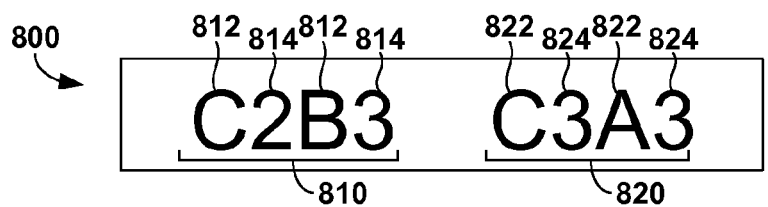
FIG. 8 illustrates inputs associated with FIG. 7, in accordance with an embodiment of the present invention.

FIG. 8 illustrates inputs 800 associated with FIG. 7, in accordance with an embodiment of the present invention. In particular, inputs 800 include "C2-B3" to indicate first relationship 810. In particular, inputs 800 include column identifiers 812 and row identifiers 814. Additionally, inputs 800 include "C3-A3" to indicate second relationship 820. In particular, inputs 800 include column identifiers 822 and row identifiers 824.

Figure 9:
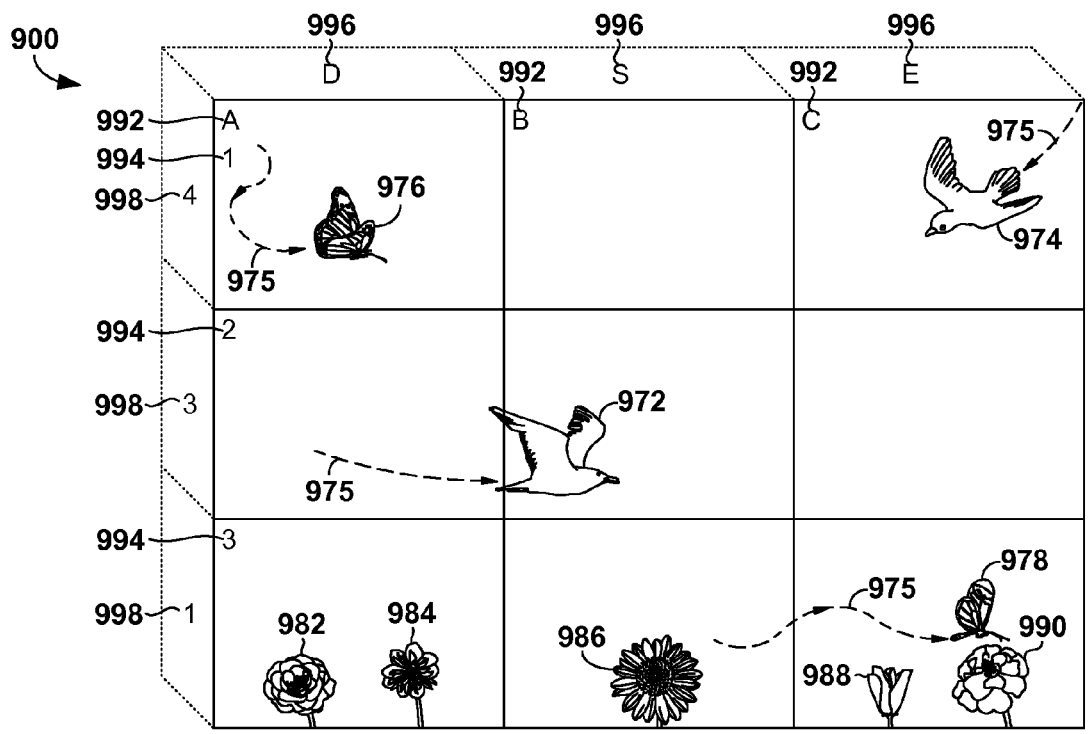
FIG. 9 illustrates a screen saver at a first current screen presentation, the screen saver including visible graphical axes and graphical axis identifiers, in accordance with an embodiment of the present invention.

FIG. 9 illustrates a screen saver 900 at a first current screen presentation 905, screen saver 900 including visible graphical axes 985 and graphical axis identifiers 992, 994, 996, and 998, in accordance with an embodiment of the present invention. In particular, graphical axis identifiers 992 and 994 and displayed on screen saver 900, while graphical axis identifiers 996 and 998 are hidden. However, graphical axis identifiers 996 and 998 are mapped to each grid square of the screen saver 900. Additionally, FIG. 9 includes dynamic display images 972, 974, 976, and 978; dynamic display image paths 975; and static display images 982, 984, 986, 988, and 990. Each of the dynamic display images and static display images may be mapped to at least one set of graphical coordinates.

Accordingly, in embodiments of the present invention, access to a component of a computing device may be dependent upon entering coordinate-based relational information relating two or more images displayed on screen saver 900. For additional security, however, the graphical axis identifiers 992 and 994 displayed may differ from the graphical axis identifiers 996 and 998 that are the basis for the coordinate-based relational information relating two or more images displayed on screen saver 900. For example, birds 972 and 974 may seem to be mapped to coordinates "B2" and "C1," but they are actually mapped to coordinates "S3" and "E4," respectively. Further, while butterflies 976 and 978 may seem to be mapped to coordinates "A1" and "C3," they are actually mapped to coordinates "D4" and "E1," respectively. Further, flowers rose 982, flower 984, daisy 986, tulip 988, and hydrangea 990 may seem to be mapped to coordinates "A3," "A3," "B3," "C3," and "C3," respectively, but are actually mapped to coordinates "D1," "D1," S1," "E1," and "E1," respectively. As such, one authorization code associated with screen saver 900 may include reference to a first relationship of a bird, such as bird 972, in relation to a daisy and a second relationship of a butterfly, such as butterfly 978, in relation to a rose. Accordingly, using the mappings listed above, one set of inputs is accurate based on first current screen presentation 905.

Figure 10:
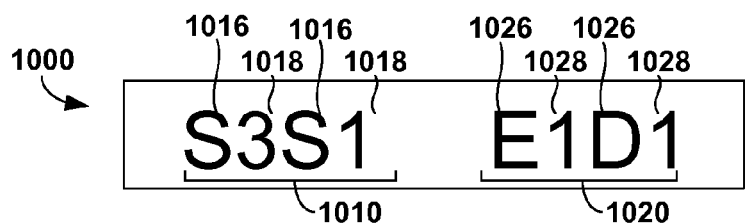
FIG. 10 illustrates inputs associated with FIG. 9, in accordance with an embodiment of the present invention.

FIG. 10 illustrates inputs 1000 associated with FIG. 9, in accordance with an embodiment of the present invention. In particular, inputs 1000 include "S3-S1" to indicate first relationship 1010. Inputs 1000 include column identifiers 1016 and row identifiers 1018. Additionally, inputs 1000 also include "E1-D1" to indicate second relationship 1020. In particular, inputs 1000 include column identifiers 1026 and row identifiers 1028.

Figure 11:
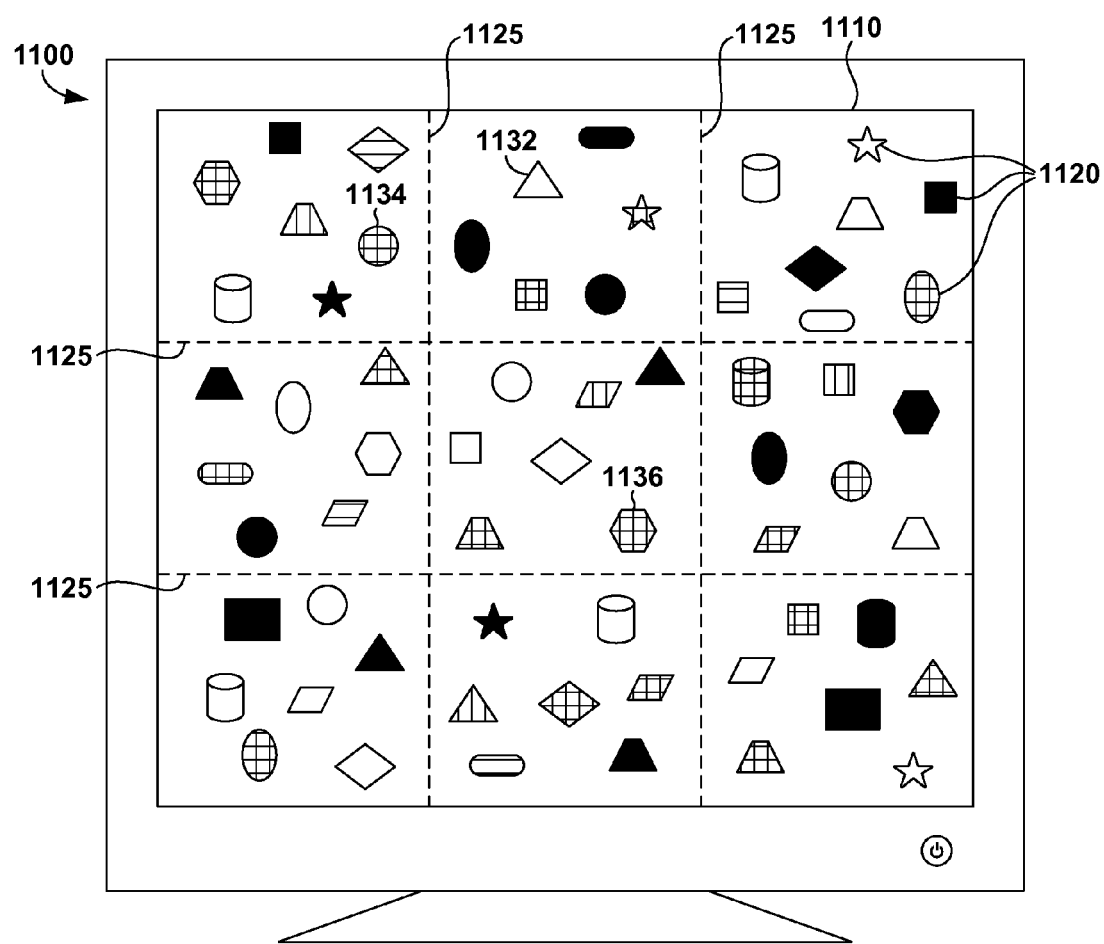
FIG. 11 illustrates an access panel touchpad including a first configuration of graphical axes, in accordance with an embodiment of the present invention.

FIG. 11 illustrates an access panel touchpad 1100 including a first configuration 1110 of graphical axes 1125, in accordance with an embodiment of the present invention. Touchpad 1100 may be used to grant access to a component of a secured device. In particular, touchpad 1100 may be used to input an authentication code that is secure, even when a potential unauthorized user may be watching the user input his authorization code. In embodiments, a user may select a particular image in a grid square by touching any part of the grid square. As such, if an authorization code associated with a user includes reference to a white triangle 1132, checkered circle 1134, and checkered hexagon 1136 of images 1120, a user may touch any part of each associated grid square of touchpad 1100 to input each element of the code. Further, since each grid square includes a plurality of images, a potential unauthorized user may find it very difficult to decode the user's authorization code. In fact, in FIG. 11, each grid square contains at least six alternate pattern-shaped combinations of images 1120.

Additionally, in embodiments, a new configuration of images may be presented to a user in response to a code being entered. The new configuration of images may be presented independent of whether the input code is accurate. Alternatively, whether a configurations of images is presented in response to the input of a code may be dependent upon the accuracy of a previously entered code, such as an immediately previously entered code. As such, a potential unauthorized user may not just remember the grid squares that had been touched by the authorized user in order to gain unauthorized access to the component of the computing device.

Figure 12:
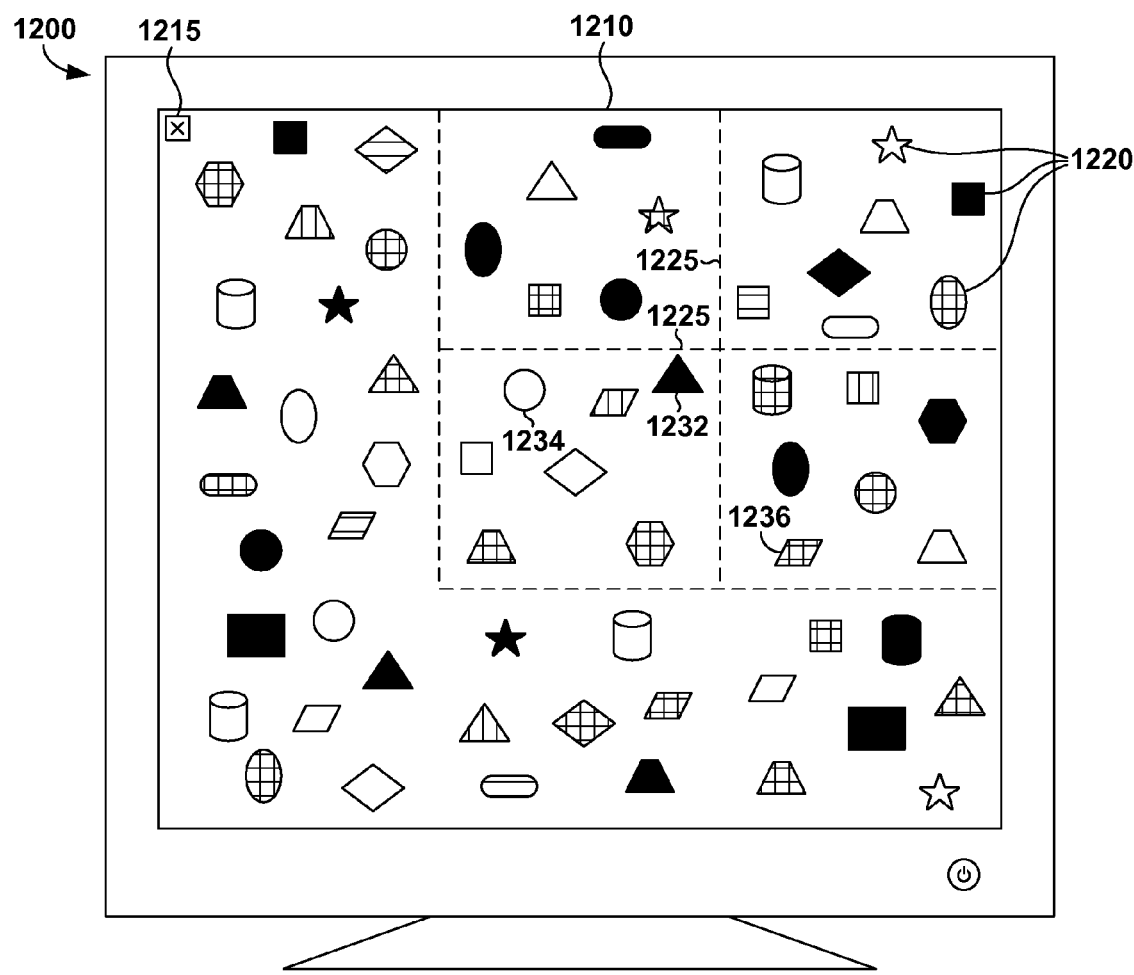
FIG. 12 illustrates an access panel touchpad including a second configuration of graphical axes, in accordance with an embodiment of the present invention.

In addition to changing the configuration of images presented in touchpad 1100, the location of an input graph may also be changed. For example, an alternative input graph is provided in FIG. 12. As such, FIG. 12 illustrates an access panel touchpad 1200 including a second configuration 1210 of graphical axes 1225 based on configuration indicator 1215, in accordance with an embodiment of the present invention. In particular, the sum of the graphical axes 1225 of the grid squares in FIG. 12 only takes up a portion of the total area of touchpad 1200. Further, grid squares that are input to indicate an authorization code may be dependent upon a particular arrangement of graphical axes 1225 as indicated by a configuration indicator 1215. As such, if an authorization code associated with a user includes reference to a black triangle 1232, white circle 1234, and checkered parallelogram 1236 of images 1220, the accurate grid squares selected may comprise squares in the middle and upper right portions of touchpad 1200 when configuration indicator 1215 has a checked box.

Figure 13:
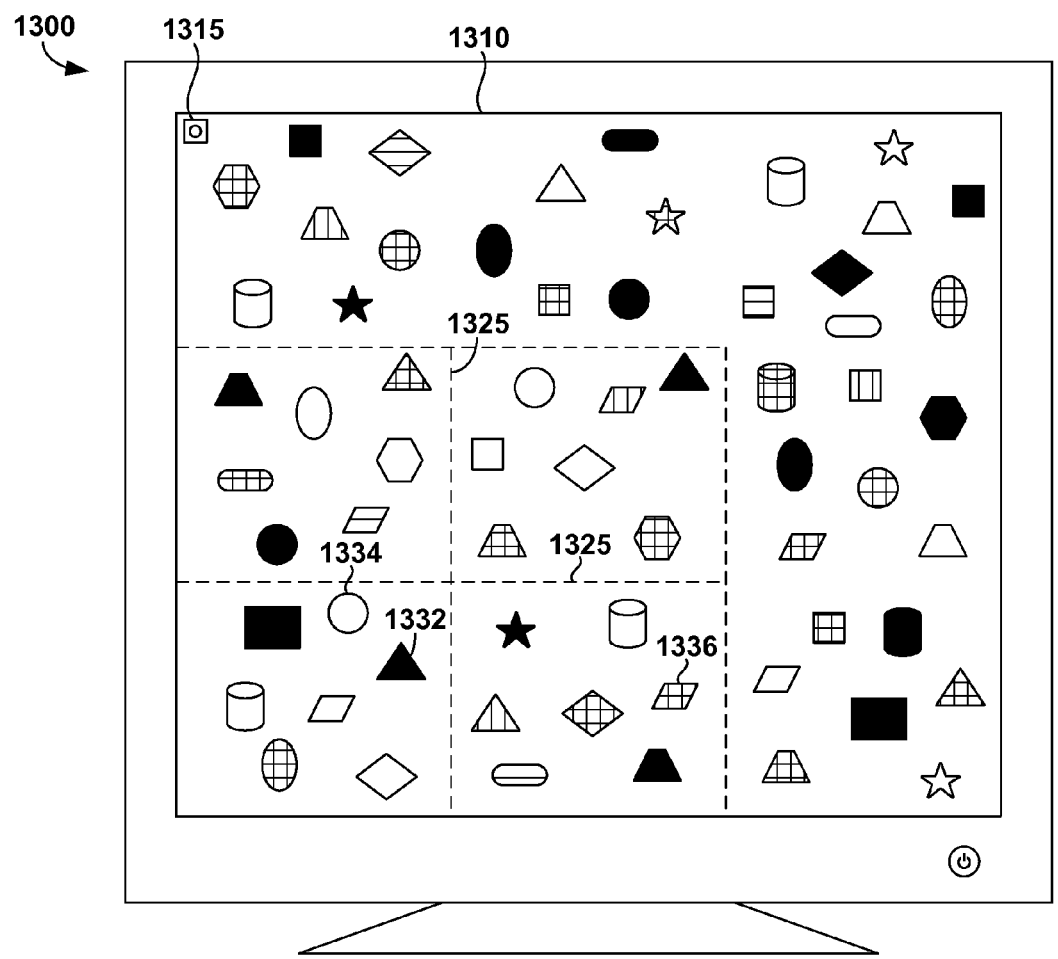
FIG. 13 illustrates an access panel touchpad including a third configuration of graphical axes, in accordance with an embodiment of the present invention.

However, the accurate grid squares associated with the same authorization code may differ when the configuration indicator changes. For example, FIG. 13 illustrates an access panel touchpad 1300 including a third configuration 1310 of graphical axes 1325 based on configuration indicator 1315, in accordance with an embodiment of the present invention. Similar to FIG. 12, the sum of the graphical axes 1325 of the grid squares in FIG. 13 only takes up a portion of the total area of touchpad 1300. Further, grid squares that are input to indicate an authorization code may be dependent upon a particular arrangement of graphical axes 1325 as indicated by configuration indicator 1315. As such, if an authorization code associated with a user includes reference to a black triangle 1332, white circle 1334, and checkered parallelogram 1336 of images 1320, the accurate grid squares selected may comprise grid squares in the middle and lower left portions of touchpad 1300 when configuration indicator 1315 has a circled box.

Figure 14:
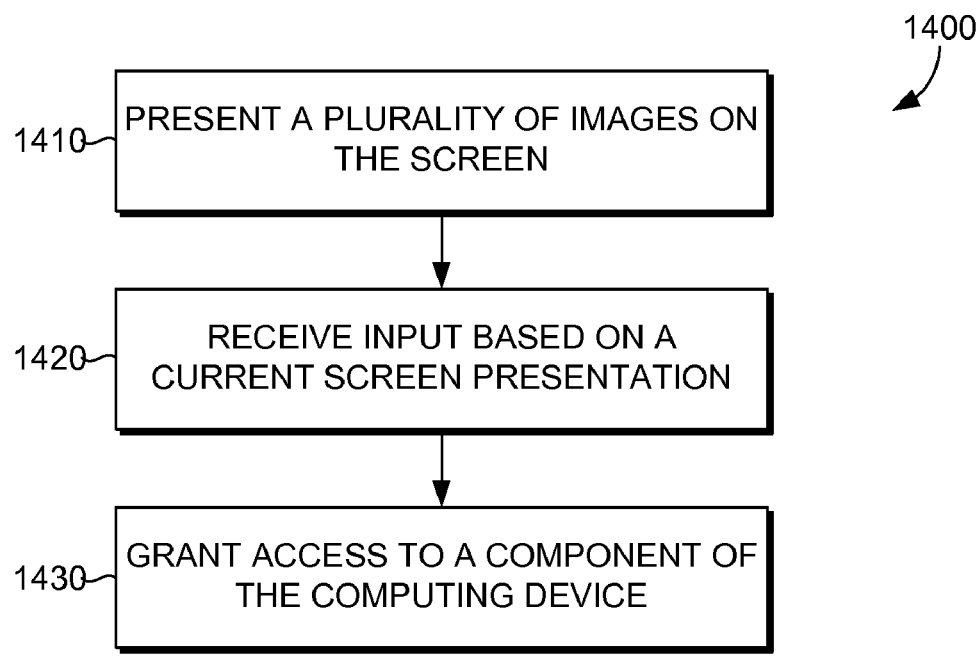
FIG. 14 is a flow diagram showing a method of granting access to a component of a computing device, which includes a screen and a keyboard, in response to receiving input based on a current screen presentation on the computing device, in accordance with an embodiment of the present invention.

FIG. 14 is a flow diagram showing a method of granting access to a component of a computing device, which includes a screen and a keyboard, in response to receiving input based on a current screen presentation on the computing device, in accordance with an embodiment of the present invention. At block 1410, a plurality of images is presented on the screen. In particular, the plurality of images is presented on the screen of the computing device. A portion of the plurality of images may comprise dynamic images. Additionally and/or alternatively, a portion of the plurality of images may comprise static images. Further, a portion of the plurality of images may comprise a set of images that overlap at least one other image of the plurality of images.

The screen is logically divided into a plurality of regions. The plurality of regions may comprise the entire screen. Alternatively, the plurality of regions may comprise a portion of the screen. Further, each region is mapped to at least one key of a keyboard. In particular, each region is mapped to at least one key of a keyboard of the computing device.

At block 1420, input based on a current screen presentation is received. In particular, input is based on the current screen presentation. Further, the current screen presentation comprises images of the plurality of images in regions of the screen. In embodiments, input may be received by way of a keyboard. Additionally and/or alternatively, input may be received by way of a touch pad. A touch pad may be within a screen, such as a touch screen. Further, input may comprise location-based identifiers of images of the plurality of images. As such, input may illustrate location-based relationships between the images of the plurality of images.

At block 1430, access is granted to a component of the computing device. In particular, access is granted when input provided is accurate based on the current screen presentation. The accuracy of the input may be assessed based on location-based relationships between the images of the plurality of images. In embodiments, each relationship between images may be associated with its own, distinct current screen presentation. Alternatively, each relationship between images may be based on the same current screen presentation. Additionally, the computing device may be a secured device.

Figure 15:
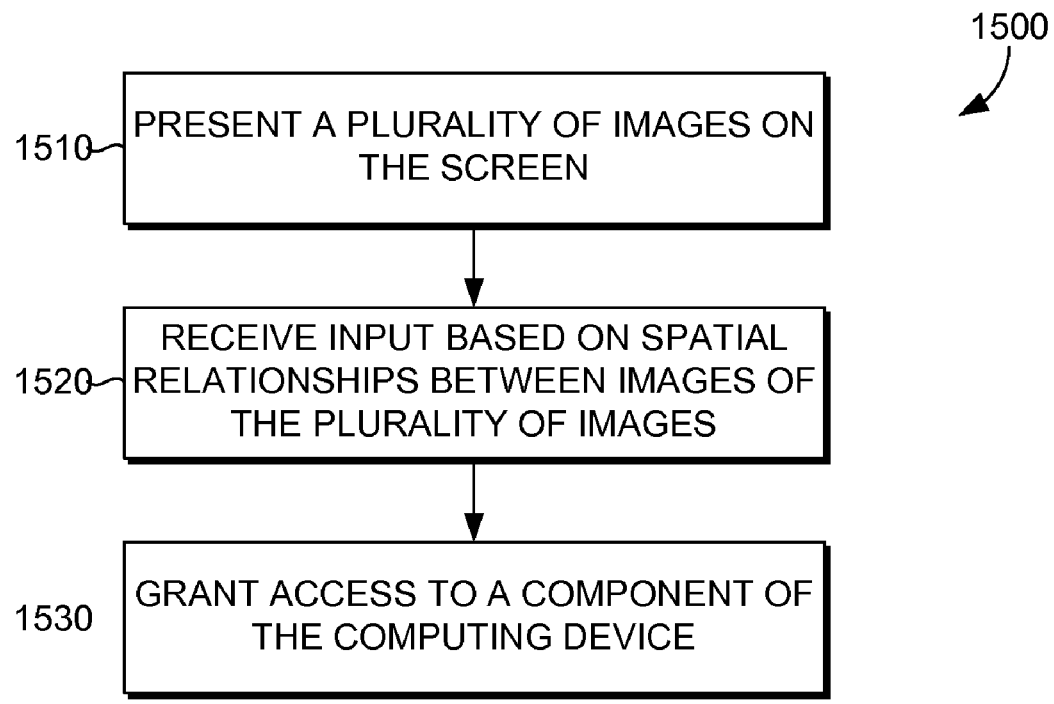
FIG. 15 is another flow diagram showing a method of granting access to a component of a computing device, which includes a screen and a keyboard, in response to receiving input based on a current screen presentation on the computing device, in accordance with an embodiment of the present invention.

FIG. 15 is another flow diagram showing a method of granting access to a component of a computing device, which includes a screen and a keyboard, in response to receiving input based on a current screen presentation on the computing device, in accordance with an embodiment of the present invention. At block 1510, a plurality of images is presented on the screen. In particular, the plurality of images is presented on the screen of the computing device. A portion of the plurality of images may comprise dynamic images. Additionally and/or alternatively, a portion of the plurality of images may comprise static images. Further, a portion of the plurality of images may comprise a set of images that overlap at least one other image of the plurality of images.

The screen is logically divided into a plurality of regions. The plurality of regions may comprise the entire screen. Alternatively, the plurality of regions may comprise a portion of the screen. Further, each region is referenced by graphical axes. Each graphical axis is mapped to at least one key of the keyboard. In particular, each graphical axis is mapped to at least one key of the keyboard of the computing device.

At block 1520, input based on spatial relationships between images is received. In particular, input based on spatial relationships between images of the plurality of images is received. Further, the plurality of images is presented in the current screen configuration. In embodiments, input may be received by way of a keyboard. Additionally and/or alternatively, input may be received by way of a touch pad. Further, input may comprise location-based identifiers of images of the plurality of images. In particular, the location-based identifiers may be based on the graphical axes mapped to keys of the keyboard. For example, the input may comprise graphical coordinates of the images of the plurality of images. As such, input may illustrate location-based relationships between the images of the plurality of images.

At block 1530, access is granted to the component of the computing device. In particular, access is granted when input provided is accurate based on the current screen presentation. The component of the computing device may be a login screen. The accuracy of the input may be assessed based on location-based relationships between the images of the plurality of images. In embodiments, each relationship between images may be associated with its own, distinct current screen presentation. Alternatively, each relationship between images may be based on the same current screen presentation. Additionally, the computing device may be a secured device.

In a further embodiment, where a second input is received, access may be granted to a second component of the computing device when the second input provided is inaccurate based on the current screen presentation. For example, the second component presented may be a false login screen. In particular, the false login screen may include an image of a login screen that will allow a user, such as an unauthorized user, to input login information. However, since the unauthorized user failed to provide accurate input to the computing device, the unauthorized user may be presented with a failed login screen independent of whether the unauthorized user presented login information otherwise associated with an authorized user. In this way, the unauthorized user may not even be aware that he failed a first authorization test in accordance with embodiments of the present invention. Rather, the unauthorized user may simply believe the authorized user changes his login information, such as his login password.

Figure 16:
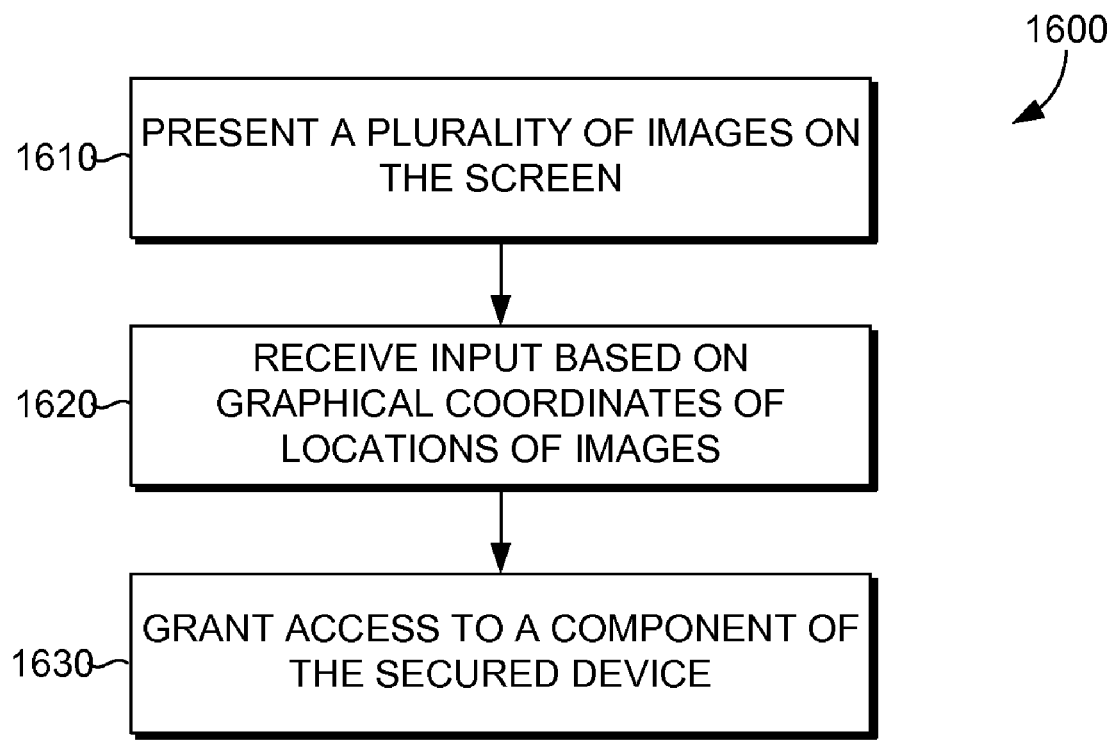
FIG. 16 is a flow diagram showing a method of granting access to a component of a secured device, which includes a screen and a keyboard, in response to receiving input based on a current screen presentation on the secured device, in accordance with an embodiment of the present invention.

FIG. 16 is a flow diagram showing a method of granting access to a component of a secured device, which includes a screen and a keyboard, in response to receiving input based on a current screen presentation on the secured device, in accordance with an embodiment of the present invention. At block 1610, a plurality of images is presented on the screen. In particular, the plurality of images is presented on the screen of a secured device. A portion of the plurality of images may comprise dynamic images. Additionally and/or alternatively, a portion of the plurality of images may comprise static images. Further, a portion of the plurality of images may comprise a set of images that overlap at least one other image of the plurality of images.

The screen is logically divided into a plurality of regions. The plurality of regions may comprise the entire screen. Alternatively, the plurality of regions may comprise a portion of the screen. Further, each region is referenced by graphical axes. Each graphical axis of the graphical axes has at least one graphical indicator. Further, each graphical axis of the graphical axes is mapped to at least one key of the keyboard. In particular, each graphical axis is mapped to at least one key of the keyboard of the computing device.

At block 1620, input based on graphical coordinates of locations of images is received. In particular, input based on graphical coordinates of locations of images of the plurality of images is received. Further, the plurality of images is presented in the current screen configuration. In embodiments, input may be received by way of a keyboard. Additionally and/or alternatively, input may be received by way of a touch pad. Further, input may comprise location-based identifiers of images of the plurality of images. In particular, the location-based identifiers may be based on the graphical axes mapped to keys of the keyboard. For example, the input may comprise graphical coordinates of the images of the plurality of images. As such, input may illustrate location-based relationships between the images of the plurality of images. In embodiments, each graphical indicator of each graphical axis corresponds to at least one key mapped to the graphical axis. Additionally and/or alternatively, each graphical axis of each graphical axis may differ from the at least one key mapped to the graphical axis.

At block 1630, access is granted to the component of the secured device. In particular, access is granted when input provided is accurate based on the current screen presentation. The component of the computing device may be a login screen. The accuracy of the input may be assessed based on location-based relationships between the images of the plurality of images. In embodiments, each relationship between images may be associated with its own, distinct current screen presentation. Alternatively, each relationship between images may be based on the same current screen presentation.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of granting access to a component of a computing device, which includes a screen and a keyboard, in response to receiving input based on a current screen presentation on the computing device, the method comprising:
   presenting a plurality of images on the screen, which has been logically divided into a plurality of regions, wherein each region is mapped to at least one key of the keyboard;
   receiving input by way of the keyboard, wherein the input is based on the current screen presentation comprising images of the plurality of images in regions of the screen;
   granting access to the component of the computing device when the input provided is accurate based on the current screen presentation;
   receiving a second input by way of the keyboard, wherein the second input is based on the current screen presentation comprising images of the plurality of images in the regions of the screen; and
   granting access to a second component of the computing device when the second input provided is inaccurate based on the current screen presentation.

2. The non-transitory computer-readable media of claim 1, wherein a portion of the plurality of images comprises dynamic images.

3. The non-transitory computer-readable media of claim 1, wherein a portion of the screen comprises the plurality of regions.

4. The non-transitory computer-readable media of claim 1, wherein the input illustrates location-based relationships between the images of the plurality of images.

5. The non-transitory computer-readable media of claim 1, wherein the input comprises location-based identifiers of three distinct images of the plurality of images.

6. The non-transitory computer-readable media of claim 5, wherein each of the three distinct images of the input is associated with a current screen presentation.

7. The non-transitory computer-readable media of claim 5, wherein the accuracy of the location-based identifiers of the three distinct images is assessed based on the current screen presentation associated with each image.

8. The non-transitory computer-readable media of claim 5, wherein the three distinct images are associated with the same current screen presentation.

9. The non-transitory computer-readable media of claim 1, wherein the accuracy of the input is assessed based on location-based relationships between the images of the plurality of images.

10. The non-transitory computer-readable media of claim 1, wherein a portion of the plurality of images comprises a set of images that overlap at least one other image of the plurality of images.

11. The non-transitory computer-readable media of claim 1, wherein the computing device is a secured device.

12. Non-transitory computer-readable media having computer-executable instructions embodied thereon that, when executed, facilitate a method of granting access to a component of a computing device, which includes a screen and a keyboard, in response to receiving input based on a current screen configuration on the computing device, the method comprising:
   presenting a plurality of images on the screen, which has been logically divided into a plurality of regions referenced by graphical axes, wherein each graphical axis is mapped to at least one key of the keyboard;
   receiving input by way of the keyboard, wherein the input is based on spatial relationships between images of the plurality of images as presented in the current screen configuration;
   granting access to the component of the computing device when the input provided is accurate based on the current screen presentation;
   receiving by way of the keyboard, wherein the second input is based on spatial relationships between images of the plurality of images as presented in the current screen configuration; and
   granting access to a second component of the computing device when the second input is inaccurate based on the current screen configuration.

13. The non-transitory computer-readable media of claim 12, wherein the computing device is a secured device.

14. The non-transitory computer-readable media of claim 12, wherein the input comprises graphical coordinates of the images of the plurality of images.

15. The non-transitory computer-readable media of claim 12, wherein the component is a login screen.

16. The non-transitory computer-readable media of claim 12, wherein the component is a false login screen.

17. Non-transitory computer-readable media having computer-executable instructions embodied thereon that, when executed, facilitate a method of granting access to a component of a computing device, which includes a screen and a keyboard, in response to receiving input based on a current screen presentation on the secured device, the method comprising:
   presenting a plurality of images on the screen, which has been logically divided into a plurality of regions referenced by graphical axes, each graphical axis of the graphical axes having at least one graphical axis indicator, wherein each graphical axis of the graphical axes is mapped to at least one key of the keyboard;
   receiving input by way of the keyboard, wherein the input is based on graphical coordinates of locations of images of the plurality of images as presented on a current screen configuration;
   granting access to the component of the secured device when the input provided is accurate based on the current screen presentation,
   receiving a second input by way of the keyboard, wherein the second input is based on graphical coordinates of locations of images of the plurality of images as presented on the current screen presentation; and
   granting access to a second component of the computing device when the second input provided is inaccurate based on the current screen presentation.

18. The non-transitory computer-readable media of claim 17, wherein each graphical indicator of each graphical axis corresponds to the at least one key mapped to the graphical axis.

19. The non-transitory computer-readable media of claim 17, wherein each graphical indicator of each graphical axis differs from the at least one key mapped to the graphical axis.

* * * * *